F. P. RYDER.
GREEN PEA VINER.
APPLICATION FILED JAN. 6, 1915.

1,219,416.

Patented Mar. 13, 1917.
3 SHEETS—SHEET 1.

WITNESSES

INVENTOR
Frank P Ryder
BY
ATTORNEY

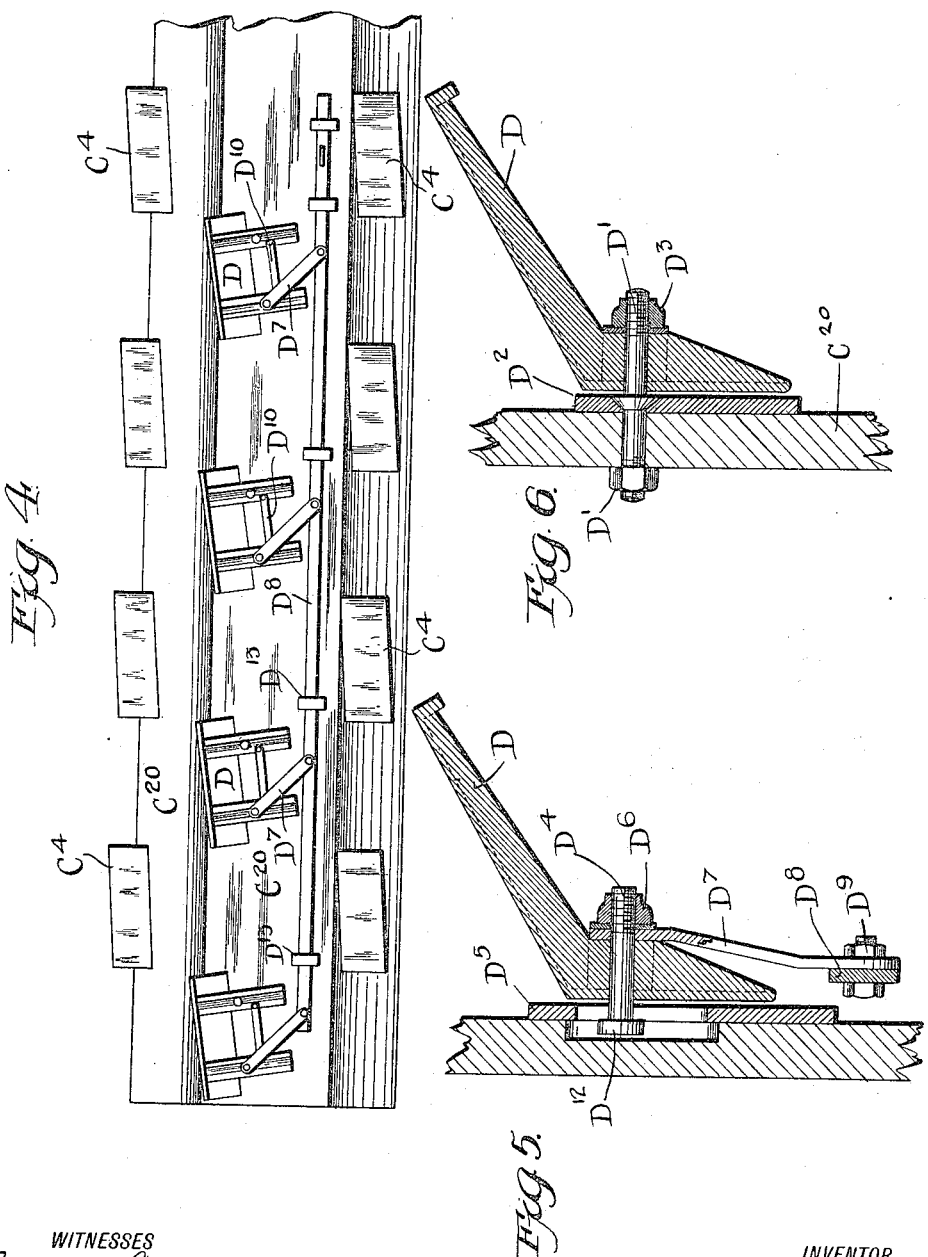

F. P. RYDER.
GREEN PEA VINER.
APPLICATION FILED JAN. 6, 1915.
1,219,416.
Patented Mar. 13, 1917.
3 SHEETS—SHEET 3.
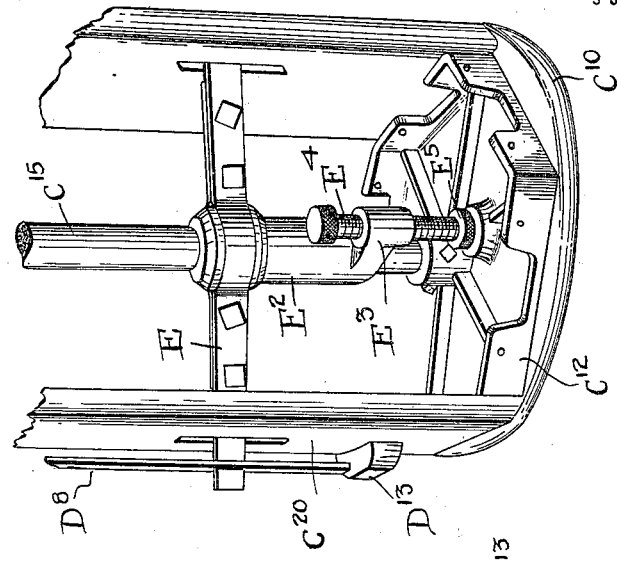
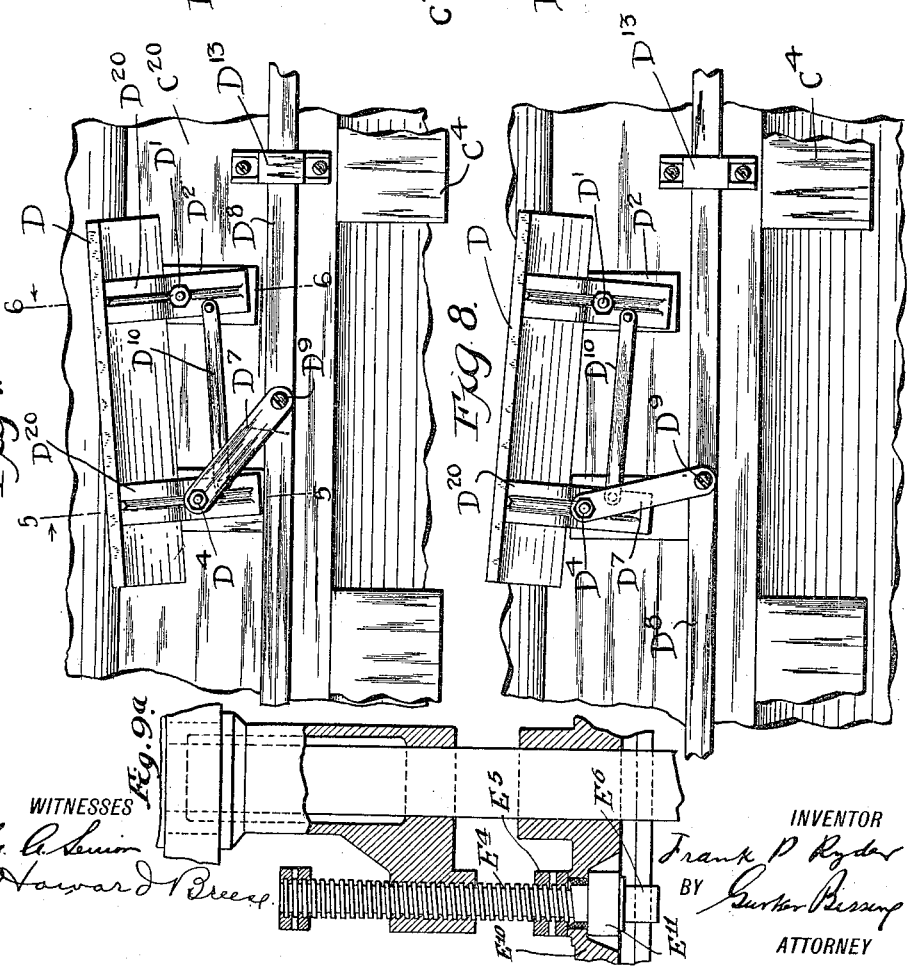
WITNESSES
INVENTOR
Frank P. Ryder
BY
ATTORNEY

UNITED STATES PATENT OFFICE.

FRANK P. RYDER, OF SUSPENSION BRIDGE, NEW YORK.

GREEN-PEA VINER.

1,219,416. Specification of Letters Patent. Patented Mar. 13, 1917.

Application filed January 6, 1915. Serial No. 870.

*To all whom it may concern:*

Be it known that I, FRANK P. RYDER, a citizen of the United States, and resident of Suspension Bridge, Niagara county, New York, have invented a new and useful Improvement in Green-Pea Viners, of which the following is a specification.

My invention is an improvement on the machine for hulling green peas while the pods are yet attached to the vines, shown in Patent No. 500299 to Chisholm and Scott, and now in practically universal use in this country for its purpose. In this machine the pea vines with the green peas attached are fed into a slowly revolving outer drum carrying longitudinal lifting ribs along its inner surface, which raise the vines and attached peas to the upper half of the drum, whence they fall into the path of broad, slanted beaters secured to a rapidly revolving inner cylinder, the peas being thus struck in mid-air and shelled according to the principle of the Chisholm Patent No. 421244 and the slant of the beaters causing the trajectory of the mass of vines, which lies above the inner cylinder, to be toward the discharge end. The principle of operation is *sui generis* and differs cardinally from that exemplified in threshing machines for dried grain in which the action is of a shredding or abrasive character and takes place in the lower half of the rotary container and where the elements corresponding to the broad beaters above mentioned have the shape of narrow teeth.

Certain objections have developed to this green pea viner, as it is called. As now constructed, the slant of the beaters, from which flows the number of times a mass of pea vines is impacted in its transit through the machine, is determined, once for all, by the builder and, being determined, remains fixed. The only factor which the user can alter is the rotary beater speed. Now it is impracticable to make the viner drum long enough to certainly hull all or 100% of the peas, at reasonable beater speeds, before the vines are discharged from the exit end, since this, with certain pea varieties, would mean doubling the present length, which is already about twelve feet. Nor is it possible to reduce the waste in unhulled pods by raising the beater speeds too high since this results in damaging the tender pea berries. In consequence, with the present fixed beater slant, the skilled canner has the option of keeping down his beater speed and thus having but few damaged pea berries but a somewhat large percentage of unhulled pods in the discharge or of raising his beater speed, thus increasing the proportion of damaged peas or splits, as they are called, but diminishing the percentage of waste represented by unhulled pods in the straw.

My invention provides a green pea viner in which the slant of the revolving beaters is readily and quickly adjustable and this to a sufficient extent to compass all requirements which may arise. As a result, the canner, when he is rushed with work, may, if he likes, with my device, set the beater slant at somewhat more than present practice calls for and, at the expense of a greater wastage of unhulled pods, may increase the capacity of the viner to do the extra amount of work which the peak of the season requires. So, too, he might increase the beater speed above what is now usual and thereby also increase the capacity; but this would be at the expense of more split peas or poor quality, which is a course to be strongly discountenanced. When the season advances and the vines come from the field more slowly, the canner, with my improvement, will diminish his beater speed below what is at present customary to a point which will produce the minimum number of split peas and then diminish his beater-slant until there are no more unhulled pods in the straw than he is willing to loose. By sufficiently diminishing the beater-slant which, however, carries with it a reduction of capacity, he can reduce the wastage of unhulled peas to zero. What is more, he can make the requisite changes to effect the results outlined in a few minutes of time so that if he has been handling a load of vines having particularly refractory pods, and he is immediately thereafter called upon to thresh a load of more tender peas, he can make the necessary changes in the adjustment so quickly that he will actually undertake the work of adjusting the apparatus to his requirements instead of leaving it unadjusted, as would be the case if it took an hour or two to effect the adjustment.

The beater speed is at present changed by operating the engine governor. The beater slant, in my invention, is varied by turning a single screw on the viner with a key. It follows that I provide a pea viner in which, by the simple plan of operating or turning two controllers, the number of hulled split peas may be first reduced to a minimum and the percentage of wasted or unhulled peas can then be made zero or as near zero as we please. The viner may always be utilized at the maximum capacity for any given percentage of split and unhulled peas. Otherwise stated, the canner may, at any period of his pack, set his own standard of excellence in the matter of split and unhulled peas and attain it by the minimum reduction of machine capacity necessary for that end. By merely operating two controllers, the pea viner is made to do the most perfect possible work at the maximum capacity for a machine of the given length.

In the drawings—

Fig. 4 is a detail of the beater carrying support or prism.

Figs. 5 and 6 are details of the method of attaching the beaters.

Figs. 7 and 8 are two detail views of the beater in different positions of adjustment, and Fig. 9 is an inside view of the end of the beater carrying drum, with parts broken away.

Figure 1:
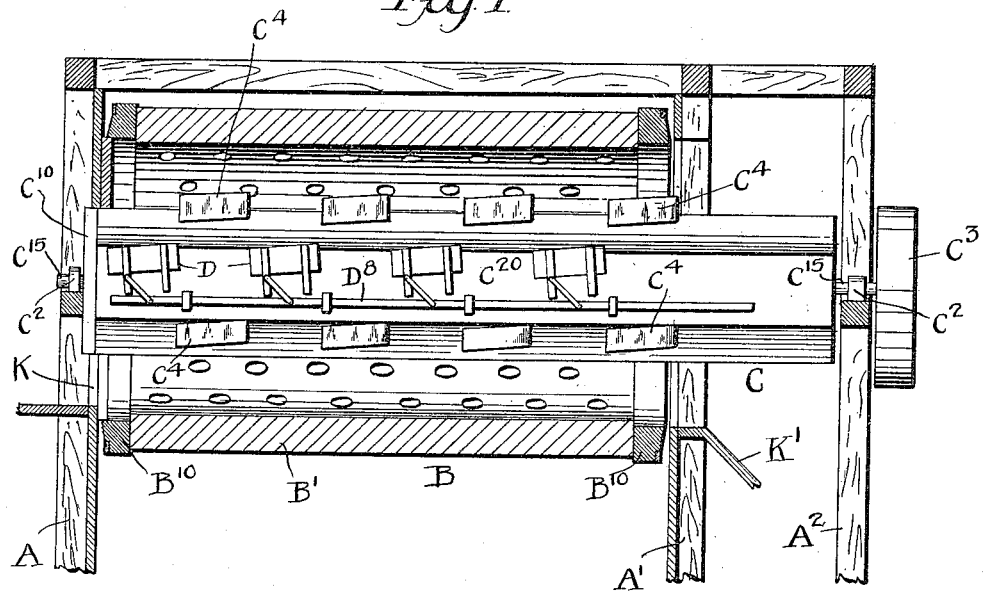
Figure 1 is a longitudinal cross section of the viner with my improvement attached.

Fig. 9$^a$ is a detail of the mounting of the operating screw.

The green pea viner or viner, as it is called, consists of frames A, A', A², the outer container or drum B being supported on travelers B³ between frames A, A' and rotated by suitable mechanism, not shown, and the inner beater support or prism C being secured to a shaft C$^{15}$ journaled in bearing C² on the frames A, A². The container or drum B consists of annular end pieces B$^{10}$ rigidly connected by lifting ribs B' and covered by a sifting surface of perforated sheet rubber or the like. The inner rotating beater-support consists of end plates C$^{10}$, each carrying a raised hexagonal flange C$^{12}$ on its inner surface, the plates being secured to the shaft C$^{15}$, to which power is transmitted by a pulley C³, and being connected by base boards C$^{20}$ to which are secured the slanted beaters C⁴.

Green pea vines with attached pea pods being fed into the feed hole K, they are lifted into the upper half of the container B by the lifting ribs B'. The vines fall from the lifting ribs when these have rotated into a position above the central shaft and their slant is downward. Falling from the ribs into the path of the beaters, which rotate in the same direction as the drum, the vines are struck and hurled across the top of the beater-support to the other side of the drum, whence they drop to the bottom, are again elevated, dropped and struck in proper sequence. Since the beaters have a slant toward the discharge end, the trajectory of the vines across the top of the beater-support is also toward the discharge end, so that each impact not merely hulls some peas but also causes the vines operated on to travel toward the exit and to finally pass out through the spokeless annulus B$^{10}$ onto the tail board K'. It is thus obvious that the number of times a given bunch of vines is struck in passing through the machine depends on the beater slant and decreases as the slant increases. So much for the machine as described in Patent No. 500299. The generic name for the beaters just described, which impact bunches of vines while they are falling through the air and thus open the peapods to release the pea berries, is impact hullers or impact openers.

I shall now describe my invention by setting forth, in detail, the best form now known to me of carrying it into practice. Instead of using rigidly fixed beaters C⁴, I employ an adjustable beater D having two brackets D$^{20}$ secured thereto or cast integral therewith, one of which I may pivot on a stud D' and secure by a nut D³, a metal plate D² being fastened against the base board C$^{20}$ in any suitable manner to furnish a smooth wearing surface for the under face of the beater D to slide upon. The other bracket D$^{20}$ carries a pin D⁴ with a head D$^{12}$ sliding in a slotted bearing plate D⁵, the head being larger than the slot or track of which the slot is a type. A link D⁷ is pivoted to the pin D⁴ and held thereon by a nut D⁶. The two brackets D$^{20}$ may be connected by a bar D$^{10}$ to secure greater steadiness.

Figure 3:
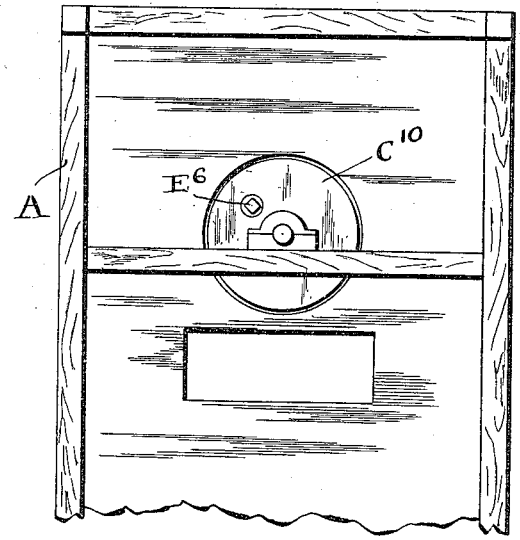
Fig. 3 is an end elevation.

One end of the link D⁷ having been pivoted to the pin D⁴, the other end is likewise pivoted at D⁹ to a bar D⁸ sliding under straps D$^{13}$. These bars D⁸ are moved back and forth by a cross bar E secured to a sleeve E², sliding on the shaft C$^{15}$, which sleeve carries a bracket E³ into which is threaded a screw E⁴ and to which is rigidly secured, in a non-rotary and non-sliding fashion, the nut E⁵. The screw E⁴ passes through the end plate C$^{10}$ and has a square end E⁶, as seen in Fig. 3, so that it may be rotated by any suitable key and is also provided with an integral flange E$^{12}$ which bears against the plate C$^{10}$, the flange and nut E⁵ holding the screw E⁴ from longitudinal motion in either direction, while permitting its rotation. The cross bar E and longitudinal bar D⁸ may, in this case, be considered as a common adjusting device for regulating the slant of a set of beaters D⁷ and the squared end of the screw may be looked upon as the actuating part for the adjusting device. It will be seen that the actuating part, in the specific construction illustrated, projects through and is located at the machine end so that it is most readily accessible and that it is non-axial so as not to interfere with the use of the central shaft for driving the feeding appliances usually actuated thereby.

It is obvious that by turning the square end $E^6$ in a given direction and thus rotating the screw $E^4$ in its thread in the bracket $E^3$, the collar $E^2$ is caused to slide on the shaft $C^{15}$ and the cross bar E to move the sliding bars $D^8$ to straighten the links $D^7$ and thus to decrease the slant of the beaters D. By turning the square end $E^6$ in the opposite direction, the beater slant is increased.

Figure 2:
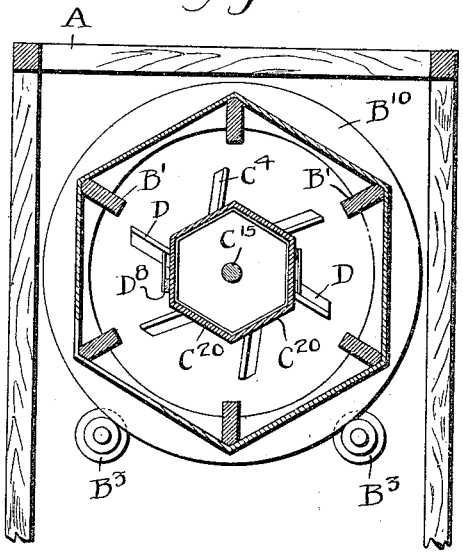
Fig. 2 is a transverse cross section of the same.

It so happens that the revolving beater support in the green pea viner, as now built, is a drum, more specifically a hexagonal prism. Each of the six faces of the prism carries a longitudinally arranged set of beaters, the interspaces between beaters on one face coming opposite the beaters on the contiguous faces. Now I have found that I can secure all the necessary effective range of slant by keeping the beaters on four of the six faces fixed and merely making adjustable the beaters on the remaining two faces, these being diametrically opposite to produce a balanced structure. Otherwise stated, the beaters are in angularly displaced positions on the beater support, the angle in this case being 180 degrees. This is indicated in Fig. 2.

So, too, I have found that I may give my adjustable beaters on the two faces of the hexagonal prism a negative pitch, as shown in Fig. 8, which will, in connection with the positive pitch of the fixed beaters on the other four faces, produce an average positive pitch somewhat less than that of the fixed beaters. In this case, however, it is advisable to keep the two adjustable beaters next the feed end adjusted to a positive pitch since there would otherwise be a tendency to throw bunches of vines which had just passed through the feed aperture back toward that aperture and thus cause clogging.

Pea vines are wet and tough and there are certain acids in their juices which are set free by impacting them. Such would cause metal parts inside the machine to rust and it is further a well known axiom of viner practice that pieces of vines will get between any moving surfaces with which they can manage to come into contact. To avoid the difficulties thus introduced and to make it possible to have the beaters sufficiently loose on their supports, when not revolving, to permit of their ready adjustment and yet thoroughly tight when rotating and at their work of impacting pea vines, I mount my beaters so that these shall be tightened against their supports only by the centrifugal force of their rotation and I call them, for this reason, centrifugally tightened beaters. In this way, I can have a longitudinal set of beaters so loose on their supports, when not revolving, that the whole lot can have their slant readily changed by operating a single rod and this without calling for undue power in effecting the operation. At the same time when the beaters are at work, the speed of their rotation develops a centrifugal force which, as actual practice has demonstrated, is fully sufficient to hold them to their seats and prevent all rattle or other objectionable disturbance.

In order to secure a mounting for the beater which is loose, when the beater support is at rest, and which is centrifugally tightened, when the beater support rotates, it is merely necessary to have the under face of the beater slide on the base plates $D^2$, $D^5$ in a fairly loose manner, with considerable clearance, and to have the pins $D'$, $D^4$ of such strength as will cause them to bend slightly when the centrifugal force comes into action. At the same time, the clearance, between beater and base plates must be such that the elastic bending limit of the pins $D'$ $D^4$ is not exceeded before the beater locks against the base plate upon its rotation.

The described mounting to secure a beater which is normally loose on its support and which centrifugally tightens on rotation is naturally but one of a number which may be used. It is equally clear that various other constructions than those shown might be employed to adjust the beaters, it being understood that the scope of my invention is not limited to the specific constructions shown except in so far as such are expressly specified in the claims.

I claim:

1. A green pea viner comprising the combination of a slowly revoluble container with interior lifting devices, a rapidly revoluble support carrying a connected set of impact openers whose slant is adjustable, and a common adjusting device therefor, substantially as described.

2. A green pea viner comprising the combination of a slowly revoluble container with interior lifting devices, a rapidly revoluble prismatic support carrying connected sets of impact openers adjustable in common on different faces, and a common adjusting device therefor substantially as described.

3. A green pea viner comprising the combination of a slowly revoluble container with interior lifting devices, a rapidly revoluble support carrying a set of simultaneously adjustable impact openers, a common adjusting device therefor and an actuating part for the adjusting device operable from the machine end substantially as described.

4. A green pea viner comprising the combination of a slowly revoluble container with interior lifting devices, a rapidly revoluble support carrying an adjustable beater, and a normally loose but centrifugally tightenable mounting for the beater substantially as described.

5. A green pea viner comprising the combination of a rotary container with interior lifting devices, a rotary prismatic support carrying slanted fixed impact-openers on some of its faces and sets of connected adjustable impact openers on two other of its opposite faces substantially as described.

6. A green pea viner comprising the combination of a slowly revoluble container with interior lifting devices, a rapidly revoluble rotary support carrying an adjustable impact means, and an actuating part for the adjustable impact means operable from the machine end, substantially as described.

7. A green pea viner comprising the combination of a slowly revoluble container with interior lifting devices, a rapidly revoluble beater support carrying adjustable beaters, a normally loose but centrifugally tightenable mounting for the beaters, and a common adjusting device for the beaters, substantially as described.

8. A green pea viner comprising the combination of a slowly revoluble container with interior lifting devices, a rapidly revoluble beater support carrying an adjustable beater, a normally loose but centrifugally tightenable mounting for the beater, and an actuating part for the adjustable beater operable from the machine end substantially as described.

9. A machine for hulling green peas on the vines comprising the combination of an outer revolving drum, a rotary beater carrier, an adjustable beater pivoted thereto at one side, a slotted bearing plate in which a projection from the beater slides at the other side and an actuating device for adjusting the beater, substantially as described.

10. A machine for hulling green peas on the vines comprising the combination of an outer revolving drum, a rotary drum beater carrier, a beater pivoted thereto at one side and moving on a track at the other side, and an actuating device for adjusting the beater, substantially as described.

11. A machine for hulling green peas on the vines comprising the combination of an outer revolving drum, a rotary prismatic beater carrier, a beater pivoted to one of its faces at one side, a link connected thereto at the other side and a sliding bar for actuating the link, substantially as described.

12. A machine for hulling green peas on the vines comprising the combination of an outer revolving drum, a rotary beater carrier, a beater pivoted thereto at one side and moving on a track at the other side, a link connected thereto on the track-side, and a sliding bar for actuating the link, substantially as described.

13. A machine for hulling green peas on the vines comprising an outer revolving drum, a rotary prismatic beater carrier, sets of beaters on opposite faces each pivoted at one end and tracked at the other end, sliding rods to adjust each set of beaters on each face, and a common actuating device for the sliding rods, substantially as described.

14. A green pea viner comprising the combination of a slowly revoluble container with interior lifting devices, a rapidly revoluble rotary support carrying an adjustable impact means, and an actuating part for the adjustable impact means operable from the exterior of the container, substantially as described.

FRANK P. RYDER.

Witnesses:
 J. R. BLANSHARD,
 MITCHELL COFFIN.

Copies of this patent may be obtained for five cents each, by addressing the "Commissioner of Patents, Washington, D. C."